Sept. 6, 1955  A. A. PETERSEN  2,717,054
APPARATUS FOR SEPARATING SUSPENDED PARTICLES FROM GASES
Filed May 19, 1953  5 Sheets-Sheet 4
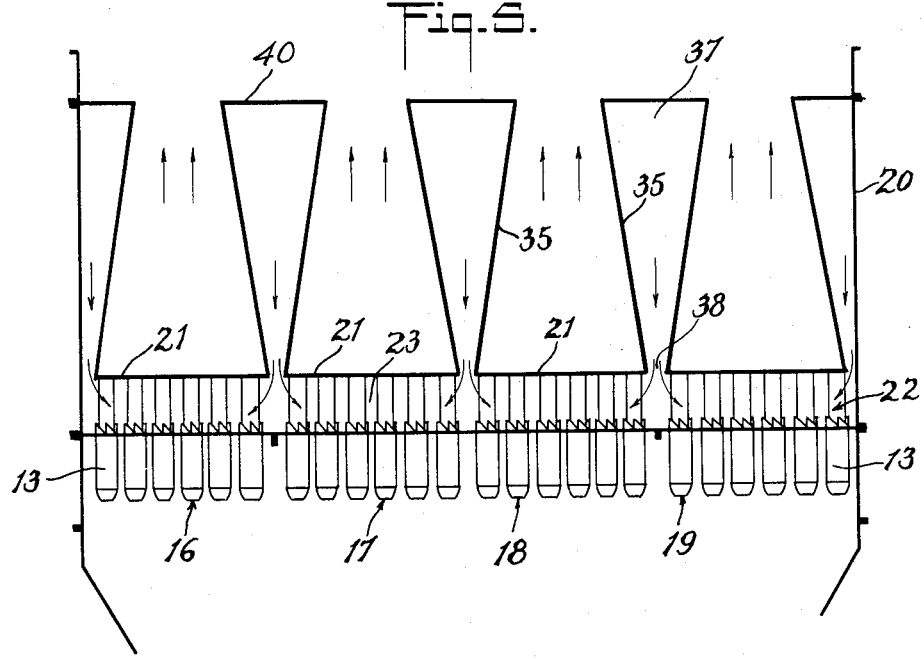
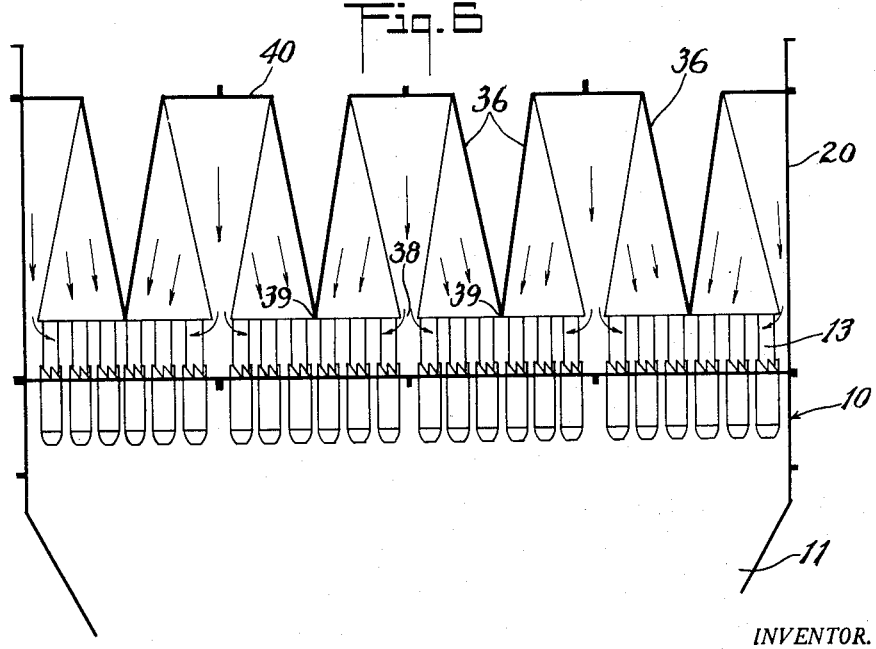
INVENTOR.
ALFRED ARNOLD PETERSEN
BY Benj. T. Rauber
ATTORNEY

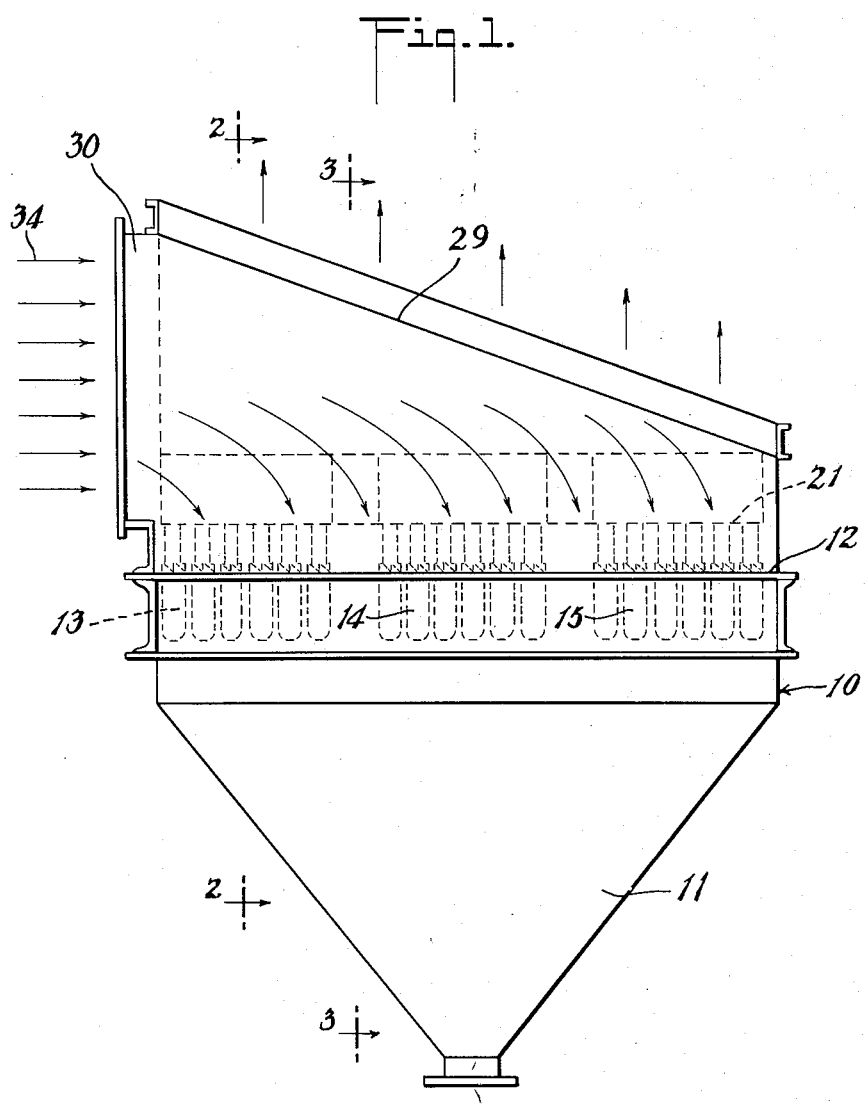

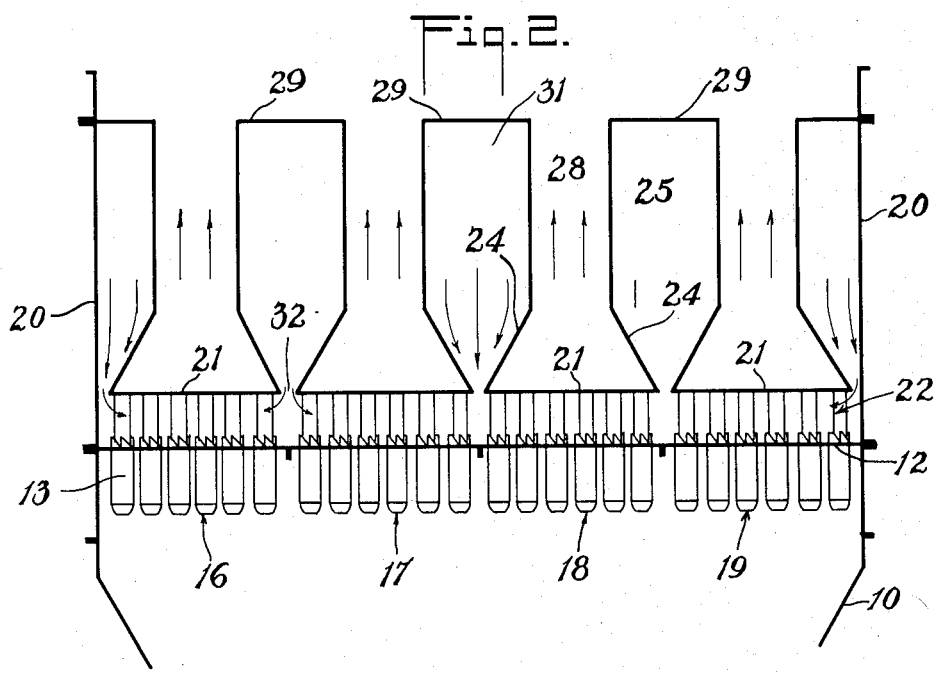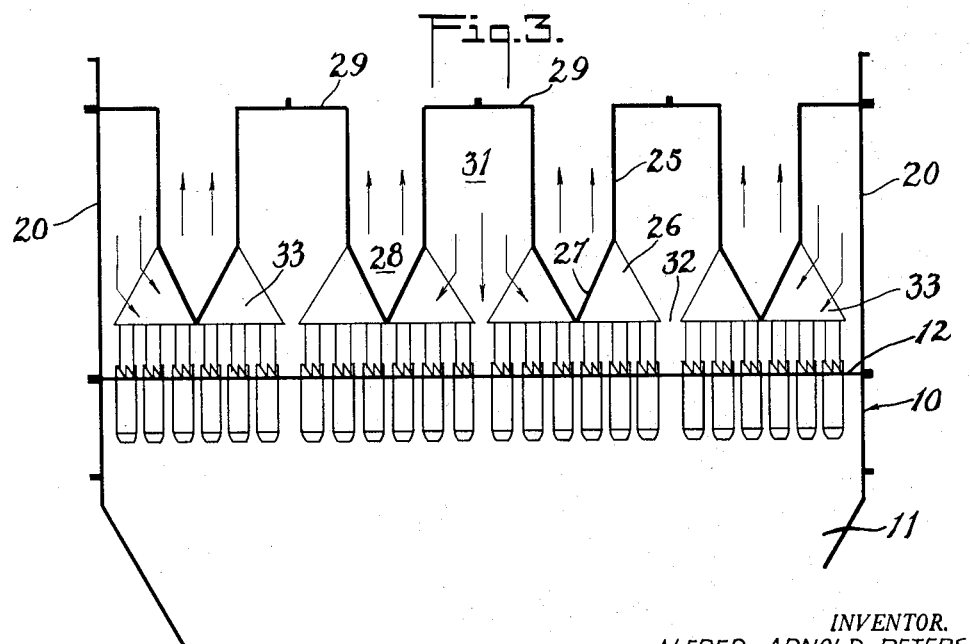

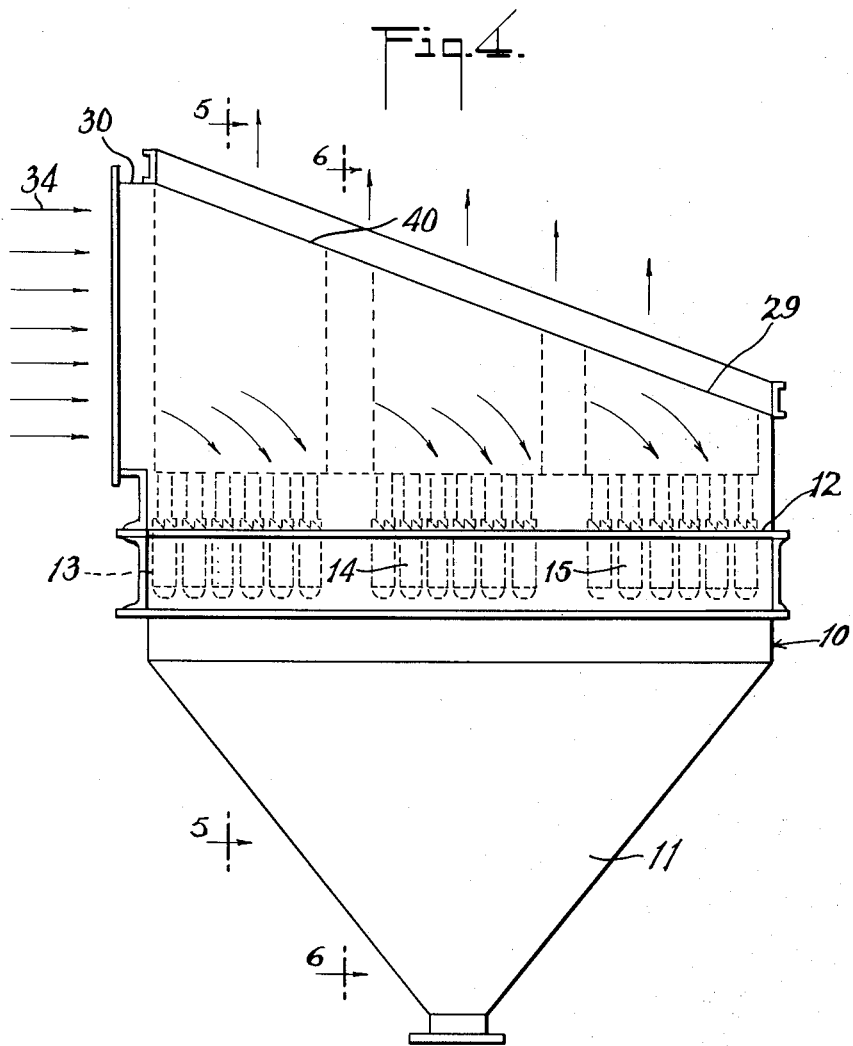

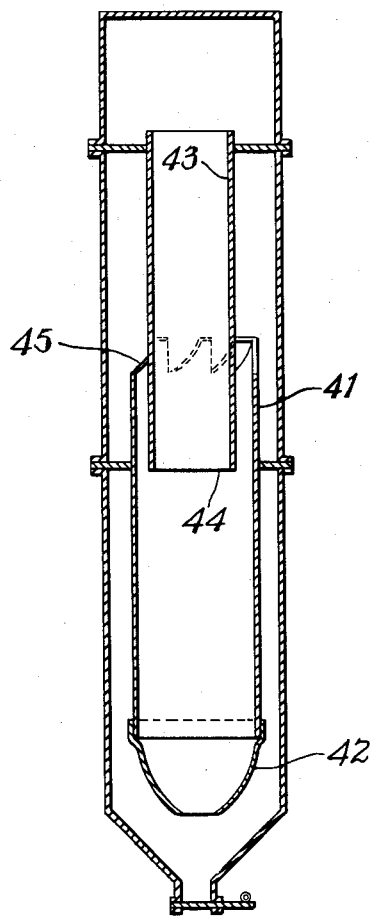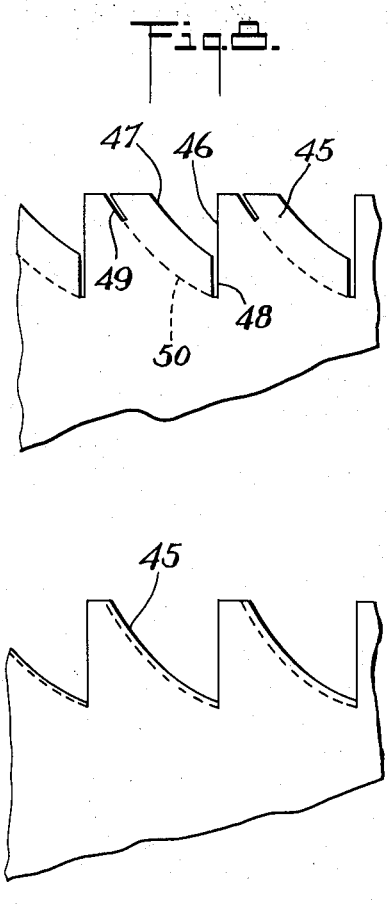

United States Patent Office 2,717,054
Patented Sept. 6, 1955

2,717,054

APPARATUS FOR SEPARATING SUSPENDED PARTICLES FROM GASES

Alfred Arnold Petersen, Byram, Conn., assignor to Prat Daniel Corporation, South Norwalk, Conn., a corporation of Connecticut Application May 19, 1953, Serial No. 356,027

6 Claims. (Cl. 183—81)

My present invention relates to multi-tube centrifugal separators for separating suspended particles from gases.

In the separation of suspended particles from air or gases in multi-tube centrifugal separators, it is desirable that the particle-laden gas be supplied to all of the tubes under substantially equal operating conditions, that is, with the gases at substantially equal pressures and volumes so that each tube operates at its optimum efficiency and capacity.

When the number of tubes is very large and, especially when the space available is limited, this equality of distribution and supply of the particle-laden gas is particularly difficult. For if the particle-laden gas must pass tubes close to the inlet to reach those farthest therefrom there is a tendency for the pressure of the particle-laden gas to vary from one tube to the next so that those tubes nearest the inlet will receive the larger quantity of the particle-laden gas at a higher pressure than those more distant.

If the plenum chamber supplying the multi-tube separators is provided with a wall that contracts downwardly or toward the tubes, to equalize the velocity and thereby the dynamic head, off-take tubes of varying heights are required in order to pass through the sloping walls.

My present invention provides apparatus in which several separating tubes of the multi-tube separator are supplied with particle-laden gases under substantially equal conditions and with a maximum economy of space.

In my present invention the tubes are grouped in a number of groups and the particle-laden gases are supplied to each individual group through supplying passages that deliver the gases to the individual groups under uniform pressure and velocity conditions. The cleaned gases are removed from the groups of separators under similar or equal off-take conditions. The groups may be made of any desired number of tubes, the number being sufficiently small to permit free flow of the particle-laden gases to all tubes of the group. The groups are closely spaced so that they will occupy a minimum of space.

For the above purpose the tubes are arranged in groups so that they deliver into a dust bin, preferably through a horizontal wall of the bin. Spaced sufficiently above this wall of the dust bin to receive the centrifugal separating tube are a number of tube plates spaced in rows which are in turn spaced in a side by side arrangement, the tube plates forming a wall of off-take chambers. Alternate supply and off-take chambers or ducts are provided by partition walls which envelop the space or spaces above the tube plates thereby forming an off-take chamber or passage. This partition wall will also separates the off-take chambers from inlet or supply chambers or passages.

The partition walls converge from the side edges of the tube plates upwardly to form a passage of diminishing area immediately above the plates thence extend inwardly toward or to the center line of the row of plates and between the plates of each row diverge outwardly to provide a passage of increasing area in the spaces between the tube plates.

Conversely, the inlet passages between the outlet passages converge to narrowed passages or spaces between the tube plates of adjacent rows and diverge or increase in area transversely in the spaces between the tube plates of each row. In this manner the particle-laden gases are distributed uniformly about the periphery of the tube plates.

If the particle-laden gases are supplied horizontally from one end of the row toward the other, the top wall of the inlet passages may be sloped downwardly from the inlet toward the tube plates so as to provide a passage of diminishing vertical area from the inlet to the farthest point of distribution. This provides for a uniform speed of flow throughout the length of the inlet passage.

By causing the inlet space to narrow towards the space between the side edges of adjacent tube plates and to widen between the plates of each row, an obstacle is presented to the short circuiting or channeling of the particle-laden gas to any tube plate or tube plates with their group or groups of tubes thus ironing out any inequalities in speed or pressure before the gases pass into the spaces between the dust bin and the tube plates in which the centrifugal separating tubes are mounted.

Conversely, in the off-take chambers or passages the cleaned gases are received in relatively wider areas and are taken off through passages that narrow toward their upper or more distant end but widen in the spaces between the tube plates of each row.

It will be understood that if the particle-laden gases are supplied downwardly to the inward passages there will be no inclined top plate but an inclined top plate would then be used in the off-take chambers slanting upwardly toward the outlet. It will also be understood that the enveloping partition walls need not slope to the top of the inlet and outlet chambers but may slope to a level and then continue vertically upwardly particularly if an inclined top plate is used.

Any suitable type of centrifugal separating tube may be employed. Preferably a tube is used having rotatory inlets spaced about an axial off-take tube which conducts the cleaned air to the off-take chambers. The rotatory inlets or passages may be a single tangential inlet or an annular inlet having deflecting vanes but preferably comprises a tube having symmetrically spaced inclined ramps in an annular space between the upper end of the centrifugal tube and the off-take pipe or tube and with the wall of the tube cut away above the ramp to a vertical line from the top of the next ramp. This provides free and uniform inflow of the particle-laden gas sidewise and from above onto the ramp with a minimum of impingement of the ramp. The ramp may be formed by cutting the wall of the centrifugal tube at its upper end to a number of inverted sawtooth cuts, or may be formed by suitably slitting the wall and bending it to form the ramp which is then trimmed to a cylindrical inner edge to receive and hold the off-take tube with a pressure or gripping contact.

The various features of the invention are illustrated, by way of example in the accompanying drawings in which:

Fig. 1 is a side elevation showing the arrangement of the groups and the direction of flow of the particle-laden gases fed to one end of the separator;

Fig. 2 is a vertical section taken on line A—A of Fig. 1;

Fig. 3 is a vertical section taken on the line B—B of Fig. 1;

Fig. 4 is a side view of another embodiment of the invention;

Fig. 5 is a vertical section taken on line C—C of Fig. 4;

Fig. 6 is a vertical section taken on line D—D of Fig. 4;

Fig. 7 is a vertical section showing a tube suitable for use in the apparatus of Figs. 1–6;

Fig. 8 is a development view of a manner of slitting a tube for bending portions to form a ramp;

Fig. 9 is a development view showing the position after the cut parts have been bent to form the ramps.

Referring more particularly to Figs. 1, 2 and 3, the separator comprises a dust bin 10 having a funnel shaped lower part 11 and a substantially flat horizontal wall 12.

As shown in Fig. 1, the groups 13, 14 and 15 of centrifugal separating tubes are arranged at spaced intervals in a row extending from one end of the plate 12.

As shown in Figs. 2 and 3, there are a number of rows of groups as indicated at 16, 17, 18 and 19, there being shown, by way of example, four rows each containing three groups of tubes. Each group may comprise thirty-six tubes arranged in a square formation. There would thus be a total of 432 tubes in the particular embodiment illustrated. It will be understood, of course, that the number of groups in a row and the number of rows and the number of tubes in a group may be varied or selected to suit any particular condition.

The tubes of each group deliver through the plate 12 into the dust bin 10. They may be arranged to extend for a short distance into the dust bin as illustrated, or for a lesser distance if desired. The space above the plate 12 is enclosed by a wall 20. Tube plates 21, one for each group, are placed at a uniformly spaced distance from the plate 12 to form a supply space 22 to supply the particle-laden gases to the respective tubes. The individual tubes admit the particle-laden gases in a rotatory direction to the upper end of the tube about an off-take pipe 23 which extends axially of each tube from a level below the inlet and extends into or delivers into the space above its respective tube plate. Particle-laden gases in the supply space 22 thus enter the several tubes with a centrifugal motion which throws the suspended particles to the wall of the respective tube and downwardly to the dust bin while the air thus cleaned reverses its direction and passes upwardly through the off-take 23 to the space above its respective tube plate.

The space above each tube plate 21 is enveloped by walls 24 joined at their lower edges to the side edges of the respective tube plate and converge upwardly thereabove to vertical walls 25. At the end edges of the tube plates of each row, the wall 24 extends vertically in contact with the end edges of its respective tube plate as at 26 to a mid position and thence extends to the next tube plate also diverging in an inclination as at 27, opposite to that shown in Fig. 2, to join the vertical wall 25.

As shown in Figs. 2 and 3, therefore, an off-take chamber is formed which converges upwardly or away from the tube plate 21 immediately above the tube plate and which diverges from a mid point between the tube plates of a row to an off-take passage 28 of uniform cross-section. The space within the enclosing wall 20 and between the off-take outlets 28 is covered or enclosed by a wall 29 which slopes downwardly from an inlet opening 30 toward the opposite end of the separator. There is thus formed between each pair of outlet passages 28 an inlet passage 31 leading from the inlet 30 to narrow passages 32 between the tube plates of adjacent rows and widened passages 33 in the spaces between adjacent tube plates of each row.

The particle-laden gases enter the inlet 30 horizontally as indicated by the arrows 34 and are then deflected downwardly and forwardly into the passages 31. Flow of the particle-laden gases downwardly to the spaces between the tube plates of adjacent rows is restricted while the passage to the space between the tube plates of each row is facilitated. This prevents channeling direct from the inlet 30 to the nearest tubes and provides a uniform distribution of particle-laden gases to all of the groups of separators. The particle-laden gas thus flows uniformly from the four edges of each tube plate inwardly toward the center. This supplies the particle-laden gases equally to those tubes at the center of each group.

It may be noted also that the inlet passages and outlet passages occupy the full space above the centrifugal separating tubes so that the greatest freedom of flow and distribution is provided above the narrow passages. The air may, therefore, flow downwardly through narrow passages 32 under uniform pressure and velocity conditions.

The particle-laden gases may be fed downwardly to the supply passages 31 which would, therefore, be open at the top, and the cleaned gases might be withdrawn longitudinally from the outlet passages 28 in which case the inclined wall 29 would cover the outlet passages instead of the inlet passages.

The total horizontal area of the passages between the converging part of the enveloping walls, as shown at 24 and the diverging parts shown at 26, may be so proportioned as to be substantially uniform at each level above and equal to the level of the tube plates 21 or may be progressively varied. The same relation would then be applied to the horizontal cross-sectional area in the off-take passages or chambers.

It is convenient when the sloping top wall 29 is employed to provide the vertical wall 25. Instead of this, however, the walls may be inclined throughout their entire area as shown in Figs. 4, 5 and 6. In this case the elements 10—23 are substantially the same as in Figs. 1–3 and are similarly numbered.

However, from the side edges of the tube plate 21 enveloping walls 35 extend upwardly and converge toward each other to form a narrowing passage, while in the spaces between successive tube plates of each row they diverge as at 36 to form a passage of decreasing cross-sectional area.

Conversely, the inlet passages 37 converge downwardly to narrow passages 38 between the side edges of the tube plates of adjacent rows, as shown in Fig. 5, and diverge between the walls 36 as indicated by the passages 39 in Fig. 6. The relationship is substantially the same as that in Figs. 1 to 3. In this case, however, an inclined top plate 40 will intersect the sloping sides 36 and 35 making the task of fitting the top plate 40 to the sloping walls somewhat more difficult.

The individual centrifugal tubes preferred for the several groups is illustrated by way of example in Figs. 7, 8 and 9. As shown in these figures a centrifugal tube 41 is provided at its lower end with a contracted dust outlet opening 42. Into the upper open end of the tube 41 there extends an off-take pipe 43 open at each end and terminating at 44 within the tube 41. Preferably the upper end of the off-take pipe 43 has a belled outlet formed either by expanding its upper end to a smooth joint with the wall of the off-take chamber, or by rounding the opening to meet the off-take pipe. This provides less space for the accumulation of dust on the wall of the off-take chamber about the off-take pipes. The upper end of the tube 41 is provided with a rotatory inlet formed by ramps 45, Fig. 9, inclined and slightly curved and extending between the tube 41 and the off-take pipe 43. The wall of the tube 41 is cut away above each ramp so that air may enter these cut away portions in a somewhat tangential direction as well as entering downwardly. This has the advantage that the particles of the gas are not impinged onto the upper surface of the ramp which would cause rapid wear.

The ramps may be formed by cutting the upper edge of the tube in a number of serrations symmetrically spaced about the circumference of the tube and then welding curved ramp pieces thereto. Or the tube may be cut with vertical edges 40 and sloping edges 47 and a vertical slope 48 and inclined slits 49, as shown in Fig. 8, and then bent inwardly on the dotted line 50. The inner edges of the tubes may then be trimmed to fit the off-take pipe 43 which may then be inserted to form a pressure fit which accurately centers the off-take pipe.

Through the above invention I have provided a multitube centrifugal separator in which the tubes may be closely spaced in a minimum of area while particle laden gases are supplied uniformly to the individual tubes and the clean gases withdrawn uniformly. This has been accomplished in my invention by having the portion of the inlet ducts farthest from the groups of tubes materially larger than the relatively restricted area nearest the inlet of the tubes and this restricted area compensates for the disadvantages of greater resistance to gas flow by the very fact that the gas is more nearly uniformly distributed to each group of tubes.

Between each group of tubes of each row an additional feed opening is provided at the ends of each group in each row rather than limiting the feeding solely to the sides of said groups at which point the nozzle effect is most effective. This arrangement promotes uniform flow into each group of tubes.

The arrangement of a top outlet from the discharge from the tubes is made of decreasing area at the final outlet compared with the area immediately above the tube outlets, has the same advantages of evening out the flow of gas from the outlet ducts. This change in the cross-section of the gas passages, both for the inlet and outlet ducts, results in more uniform distribution of the gas throughout the groups of tubes, in less recirculation between tubes and in a better collection efficiency than if this had not been the case.

The above mentioned restriction of the area of the inlet flue at a point relatively close to the inlets to the groups of tubes has the additional important advantage of making it possible to space such groups at closer intervals than would have been possible otherwise and said advantage results in a lower cost of fabrication and, even more importantly, in less space occupied by the apparatus than would otherwise have been the case.

Having described my invention, what I claim is:

1. Apparatus for separating suspended particles from gases which comprises a dust bin having a top tube sheet, centrifugal separators mounted in said tube sheet in groups, said groups being arranged in spaced rows to form spaces between said rows, the groups being spaced in said rows to form transverse spaces in said rows; plates spaced vertically above said top tube sheet to form plenum spaces, one plate for each group of tubes and having longitudinal and transverse edges spaced to provide longitudinal and transverse passages downwardly to the longitudinal and transverse spaces, respectively, between said groups of tubes, each centrifugal separator having an off-take pipe extending through the plenum space and through the plate of its group and each separator having a rotatory inlet about its off-take pipe from its plenum space into said tube, and a pair of partition walls, one on each side of and joined to, each row of plates and extending upwardly to enclose an exhaust space for said off-take pipes above said plates, parts of said partition walls converging upwardly from the longitudinal edges of said plates to a throat, alternating parts of said partitions converging downwardly from said throat to a union in the transverse passages between said plates and transverse parts extending from the throat to the transverse edges of said plates to complete the enclosure.

2. The apparatus of claim 1 having a cover wall extending from an inlet to a delivery end and inclined toward said tube plates.

3. The apparatus of claim 1 in which said partition walls converge to a common plane at a distance from said tube plates and thence extend in parallel therefrom.

4. The apparatus of claim 1 in which said centrifugal tubes have rotatory inlets spaced symmetrically about the off-take pipe.

5. The apparatus of claim 1 in which said centrifugal tubes have ramps spaced symmetrically about the off-take pipe and inclined in a helical direction and in which said tube is cut away between said successive ramps.

6. The apparatus of claim 1 in which the cross-sectional areas of said inlet passages at successive planes from said tube plate are substantially uniform.

References Cited in the file of this patent

UNITED STATES PATENTS 2,472,995   Watson et al. _____ June 14, 1949

FOREIGN PATENTS 132,130   Australia _____ Apr. 11, 1949